United States Patent
Haikin et al.

(10) Patent No.: US 10,015,310 B2
(45) Date of Patent: Jul. 3, 2018

(54) DETECTION OF PRIVACY BREACH DURING A COMMUNICATION SESSION

(71) Applicant: I.M.N.A. SOLUTIONS LTD, Havatzelet Hasharon (IL)

(72) Inventors: Israel Haikin, Havatzelet Hasharon (IL); Dan Abitbol, Ashdod (IL)

(73) Assignee: I.M.N.A. SOLUTIONS LTD, Havatzelet Hasharon (IL)

( * ) Notice: Subject to any disclaimer, the term of this patent is extended or adjusted under 35 U.S.C. 154(b) by 0 days.

(21) Appl. No.: 15/604,683

(22) Filed: May 25, 2017

(65) Prior Publication Data
US 2017/0353600 A1    Dec. 7, 2017

Related U.S. Application Data

(60) Provisional application No. 62/346,607, filed on Jun. 7, 2016.

(51) Int. Cl.
| H04M 3/00 | (2006.01) |
| H04M 3/22 | (2006.01) |
| H04M 1/60 | (2006.01) |
| H04M 1/68 | (2006.01) |

(Continued)

(52) U.S. Cl.
CPC ....... *H04M 3/2281* (2013.01); *H04M 1/6041* (2013.01); *H04M 1/68* (2013.01); *H04M 3/205* (2013.01); *H04M 3/42* (2013.01)

(58) Field of Classification Search
CPC ....... B21D 43/055; G01L 21/02; H04B 15/00; H04B 1/109; H04L 29/08108; H04M 3/42093; H04M 1/6041; H04M 1/72552; H04M 1/72569; H04M 2203/2038; H04M 2203/5081; H04M 11/007; H04M 1/20; H04W 4/02; H04W 4/16

USPC .. 455/414.1, 414.2, 418, 550.1, 41.2, 226.1, 455/226.3, 296, 297, 501, 566, 569.1, 455/569.2, 570, 419; 379/7
See application file for complete search history.

(56) References Cited

U.S. PATENT DOCUMENTS

| 6,795,544 B1 * | 9/2004 | D'Arcy ............... H04M 1/6041 379/219 |
| 8,670,556 B2 * | 3/2014 | Fried ................. H04M 1/72519 379/219 |
| 9,307,075 B1 * | 4/2016 | Youngs .................. G10L 25/51 |

(Continued)

FOREIGN PATENT DOCUMENTS

EP    1684493 A2    7/2006

OTHER PUBLICATIONS

J. Eaton; N. D. Gaubitch; A. H. Moore; P. A. Naylor, "Estimation of room acoustic parameters: The ACE Challenge," in IEEE/ACM Transactions on Audio, Speech, and Language Processing, vol. 24, No. 10, pp. 1681-1693, Oct. 2016.

(Continued)

*Primary Examiner* — Binh Kien Tieu
(74) *Attorney, Agent, or Firm* — Soroker Agmon Nordman

(57) ABSTRACT

A method of identifying a breach in privacy during a communication session, including communicating with a remote communication device using a local communication device, analyzing an audio signal from the remote communication device to identify an audio input/output configuration of the remote communication device, determining from the audio input/output configuration if a breach in privacy is signified.

20 Claims, 15 Drawing Sheets

(51) Int. Cl.
*H04M 3/20* (2006.01)
*H04M 3/42* (2006.01)

(56) References Cited

U.S. PATENT DOCUMENTS

| | | | |
|---|---|---|---|
| 9,553,973 B2* | 1/2017 | Clarke | H04M 1/6041 |
| 9,698,916 B2* | 7/2017 | Ohlmeier | H04B 15/00 |
| 2007/0123202 A1* | 5/2007 | Cho | H04M 1/6041 455/403 |
| 2008/0089513 A1 | 4/2008 | Kotzin et al. | |
| 2013/0078962 A1 | 3/2013 | Clarke et al. | |

OTHER PUBLICATIONS

J. Eaton, N. D. Gaubitch, A. H. Moore, and P. A. Naylor, "ACE Challenge results technical report," Imperial College London, 2016.
Ephraim, Y., and D. Malah. "Speech Enhancement Using a Minimum Mean-Square Error Log-Spectral Amplitude Estimator." IEEE Transactions on Acoustics, Speech and Signal Processing 33, No. 2 (1985): 443-45.

* cited by examiner

DETECTION OF PRIVACY BREACH DURING A COMMUNICATION SESSION

RELATED APPLICATIONS

This application claims priority under 35 U.S.C. 120 from U.S. provisional application No. 62/346,607 dated Jun. 7, 2016, the disclosure of which is incorporated herein by reference.

FIELD OF THE DISCLOSURE

The present disclosure relates generally to determination of audio status of a communication connection and more specifically to determining if the communication connection is private or if there is a breach in the privacy of the connection.

BACKGROUND OF THE DISCLOSURE

Phone conversations and other audio conversations are held between two or more participants located in different locations, sometimes in different countries and/or continents. The phone conversations may be held between two or more telephone devices, such as mobile phones or landline phones. The participants may share sensitive information during the conversation, such as personal data, financial data, legal data, confidential data, data regarding employment, security, safety and the like.

In many cases, data is shared by a first participant based on the presumption that the second participant receiving the information is the sole listener, although the audio status of the second participant may be that he or she is speaking in speaker mode and is not alone, for example while driving with other people in a vehicle. Such a scenario results in unwanted people listening to the sensitive data, as the first participant is not aware of the mode of operation of the telephone device of the second participant.

Privacy breach of a conversation in this context can generally be described as unaware exposure of the content of a conversation to a known or unknown party due to ignorance of a participant as to whom is listening to the conversation. The privacy breach may be the result of using various peripheral equipment by the other participant, for example wired speakers, built-in speakers, Bluetooth speakers, hands free car kits and other equipment allowing more than one person to listen to the conversation simultaneously. Likewise the privacy breach may be the result of talking from a distance with the telephone device e.g. with a loud speaker (currently referred to as far talk in contrast to close talk).

SUMMARY OF THE DISCLOSURE

An aspect of an embodiment of the disclosure, relates to a system and method for determining if a breach of privacy occurs during a communication session between a local communication device and a remote communication device. An analysis application is installed on the local communication device to analyze audio signals from the remote communication device and determine an audio input/output configuration from the analysis. Identifying from the determined audio input/output configuration if the communication session is secure or a breach in privacy has occurred, for example since the remote communication device is conducted via a hands-free vehicle speaker system and not directly into the remote communication device.

In an exemplary embodiment of the disclosure, a monitoring application is installed on the remote communication device to monitor the audio output configuration of the remote communication device. Optionally, the remote communication device generates a message when an audio input/output configuration change is detected and transmits the message directly or indirectly to the local configuration device. The message may provide an indication that a security breach has developed so the user of the local communication device will take precaution not to discuss information, which is only intended privately for the user of the remote communication device.

In an exemplary embodiment of the disclosure, a combined application is used on communication devices, wherein the combined application monitors the audio output configuration of the device in which it is installed and analyzes audio signals from remote devices to determine their audio output configuration. The application may also accept messages from remote communication devices regarding their audio input/output configuration and may provide information about the audio output configuration of the local communication device to remote devices with which it is communicating.

There is thus provided according to an exemplary embodiment of the disclosure, a method of identifying a breach in privacy during a communication session, comprising:

Communicating with a remote communication device using a local communication device;

Analyzing an audio signal from the remote communication device to identify an audio input/output configuration of the remote communication device;

Determining from the audio output configuration if a breach in privacy is signified.

In an exemplary embodiment of the disclosure, the method further comprises:

Receiving a message from the remote communication device indicating that a change has occurred in the audio input/output configuration of the remote configuration device;

Determining from the change if the audio input/output configuration of the remote communication device signifies a breach in privacy of the communication session.

Optionally, the message is provided by an application that monitors the audio input/output configuration of the remote communication device. In an exemplary embodiment of the disclosure, the determining from the audio input/output configuration is compared to the determining from the change to identify if the two are in agreement. Optionally, the message is delivered directly to the local communication device. In an exemplary embodiment of the disclosure, the message is delivered to a server to deliver to the local communication device. Optionally, the content of the received message is used to determine that a change has occurred in the audio input/output configuration of the remote communication device. In an exemplary embodiment of the disclosure, the identity of a sender of the received message is used to determine that a change has occurred in the audio input/output configuration of the remote communication device. Optionally, the audio input/output configuration indicates if the user of the remote communication device is speaking directly into the remote communication device or speaking at a distance from the remote communication device. In an exemplary embodiment of the disclosure, an indication is provided in real time to the user of the local communication device if a breach in privacy is signified.

There is further provided according to an exemplary embodiment of the disclosure, a system for identifying a breach in privacy during a communication session between a local communication device and a remote communication device, comprising:

An analysis application that is installable on the local communication device, wherein the analysis application is programmed to analyze an audio signal from the remote communication device to identify an audio input/output configuration of the remote communication device and determine from the audio input/output configuration if a breach in privacy is signified.

In an exemplary embodiment of the disclosure, the analysis application is further configured to:

Receive a message from the remote communication device indicating that a change has occurred in the audio input/output configuration of the remote configuration device;

Determine from the change if the audio input/output configuration of the remote communication device signifies a breach in privacy of the communication session. Optionally, the analysis application is further configured to be installed also on the remote communication device, monitor the audio input/output configuration of the remote communication device and provide the message to the analysis application on the local communication device. In an exemplary embodiment of the disclosure, the determining from the audio input/output configuration is compared to the determining from the change to identify if the two are in agreement. Optionally, the message is delivered directly to the local communication device. In an exemplary embodiment of the disclosure, the message is delivered to a server to deliver to the local communication device. Optionally, the content of the received message is used to determine that a change has occurred in the audio input/output configuration of the remote communication device. In an exemplary embodiment of the disclosure, the identity of a sender of the received message is used to determine that a change has occurred in the audio input/output configuration of the remote communication device. Optionally, the audio input/output configuration indicates if the user of the remote communication device is speaking directly into the remote communication device or speaking at a distance from the remote communication device. In an exemplary embodiment of the disclosure, an indication is provided in real time to the user of the local communication device if a breach in privacy is signified.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

The subject matter discloses a system and a method for providing an indication to a caller (or any participant) in an audio conversation that the conversation with the other person or persons participating in the call (e.g. the receiver) is exposed to unintended listeners in the vicinity of the receiver, so that the caller may refrain from exposing information that is only intended for the person or persons receiving the call. In an exemplary embodiment of the disclosure, the method of detection is based on one or both of the following two types of detection:

1. By an agent application on the mobile device of the receiver of the call to identify hardware that is used for sounding the conversation to the receiver (listener).

2. By an analysis application at the mobile device of the caller that analyzes the audio signal received from the receiver to identify if the receiver is speaking directly into the mobile device (close talk) or speaking from a distance (far talk).

Optionally, other people can hear the conversation mainly when the audio transmitted to the phone device is outputted in a non-standard way, for example via a hands-free speaker in a vehicle. A non-standard way of outputting the audio is defined by any way of outputting the audio that is not limited to the standard internal speaker of the phone device, which outputs the audio sounds directly to the user's ear. The subject matter of the disclosure provides for making a caller or any participant of a phone call aware of a privacy breach by other participants of the conversation, so that they may adapt a proper conversation behavior and refrain from exposing private or confidential data to unwanted people or entities. When the caller or participant knows the status of audio outputs of the other participants of the conversation, he/she can choose what they say accordingly. For example, when a participant in the conversation activates a loudspeaker (instead of a standard internal speaker), the participant on the other side of the line can talk about the weather and not about personal or confidential issues.

Figure 1:
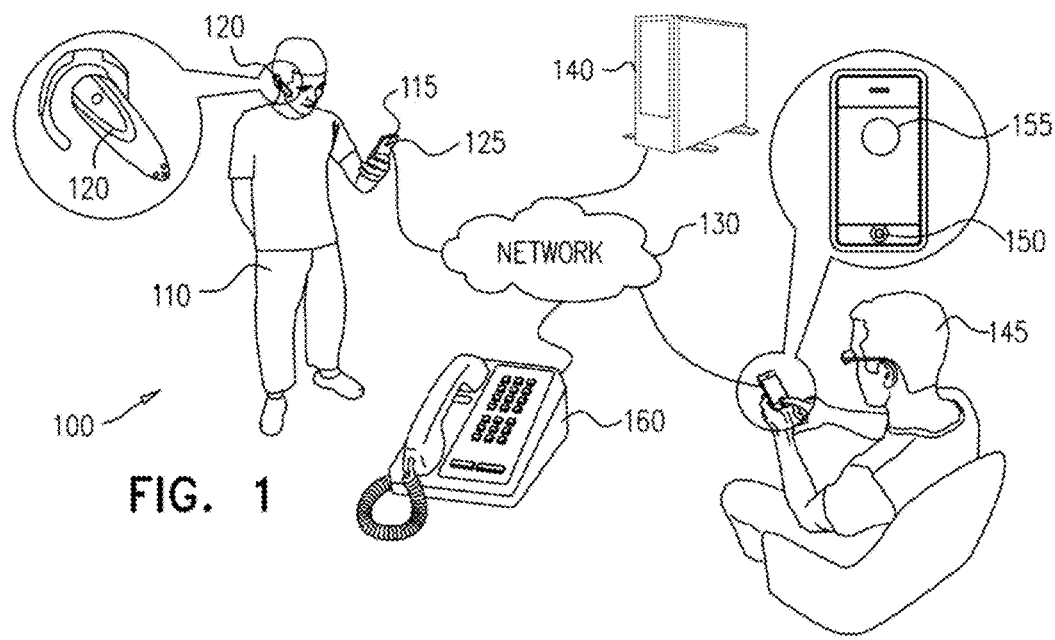
FIG. 1 is a schematic illustration of a communication environment, according to an exemplary embodiment of the disclosure.

FIG. 1 is a schematic illustration of a communication environment 100, according to an exemplary embodiment of the disclosure. The communication environment 100 includes a first participant 110 (e.g. a call receiver) with a communication device such as mobile device 115 (e.g. a smartphone). The first participant 110 participates in a phone conversation with a second participant 145 (e.g. a caller) that uses a second communication device such as mobile device 150 or a landline telephone 160. The audio signals of the phone conversation are transmitted via a network 130, such as a GSM network, the Internet, a cellular network, a satellite communication network and the like. During the phone conversation, the first person 110 may change the audio connection of the mobile device 115. For example, the first participant 110 may connect an earphone 120 to the mobile device 115, such that audio signals from the second participant 145 are transmitted from the mobile device 115 to the earphone 120. The earphone may be connected by wire or may be wireless (e.g. by Bluetooth). When the earphone 120 is connected to the mobile device 115, a computerized application 125 operating on the mobile device 115 detects the connection change to the audio output and transmits a notification of the connection to a server 140 (e.g. via the Internet or via the cellular network). The server 140 then notifies the second participant 145 of the change at the first participant 110. Optionally, the notification may be in the form of a message (e.g. SMS message, WhatsApp message) or by calling the second participant 145. Receipt of the message or call by the second participant 145 from the server 140 (even without actually reading the message or answering the call but just based on seeing the identity of the sender of the message or call (e.g. server 140)) provides a real time indication that a privacy breach has occurred and that the second participant 145 should be careful in what is disclosed to the first participant 110. Alternatively, the second participant 145 may see the message on a display of the mobile device 150 or landline device 160. The message can provide details of the event or just warn the second participant 145 to beware since a possible privacy breach has occurred.

In an exemplary embodiment of the disclosure, the first participant 110 may notify the second participant 145 directly, for example by sending a message directly to the second participant 145 (e.g. the caller). Optionally, the message may state what was changed, for example that an earphone or loudspeaker was connected. Alternatively, the message may be null and the second participant 145 is notified by the identity of the message sender.

In an exemplary embodiment of the disclosure, mobile device 150 or landline telephone 160 include an application 155 for analyzing the audio signal received from the first participant 110. Optionally, application 155 is programmed to analyze the audio signal and determine if the first participant 110 is speaking directly into the microphone and listening to the standard internal speaker of the mobile device 115 or if first participant 110 is using an external speaker, a car hand-free speaker system, an earphone 120 or other device (e.g. close talk or far talk as explained above).

In an exemplary embodiment of the disclosure, applications 125 and 155 are combined together into a single application that is installed in any communication devices such as mobile devices 115 and 150 or in a landline device 160. Optionally, this enables the communication device (115, 150, 160) to determine, which hardware is used in a conversation, notify other participants of the conversation and/or analyze a conversation to determine if a participant is speaking directly into the mobile device or using external equipment or equipment that renders the conversation non-private. In some embodiments of the disclosure, the applications (125, 150) can send messages directly from one another, for example over a cellular network or over the Internet. Optionally, the messages can initiate an alarm including audio alerts (e.g. a bell or other sounds), visual alerts (e.g. flashing lights) or tactile alerts (e.g. vibrations) to notify a caller in real time that a privacy breach has occurred at one of the participants in an ongoing conversation. In an exemplary embodiment of the disclosure, all participants are symmetric, thus during a conversation the first participant, the second participant and any other participant (e.g. in a conference call) can each provide notification (directly or via server 140) to all other participants about hardware changes and can analyze the audio signal of any other speaker.

In an exemplary embodiment of the disclosure, determination of a privacy breach may be based solely on analysis of the audio signal by the second participant 145, for example if the mobile devices (115, 150) cannot receive indications from application 125 regarding the hardware status of mobile device 115. Alternatively, determination of a privacy breach may be based solely on the detections of the first participant 110 regarding the hardware used to sound the conversation to the first participant (e.g. speaker, hands-free speaker, external speaker, and earphone). In some embodiments of the disclosure, determination may be made based on agreement between analysis of the audio signal and detection of the hardware status. Optionally, in case of disagreement application 125 will take precedence since it is based on hardware status. Alternatively, application 155 will take precedence since reports from participants may be unreliable (e.g. hacked to trick the second participant to disclose information).

Figure 2:
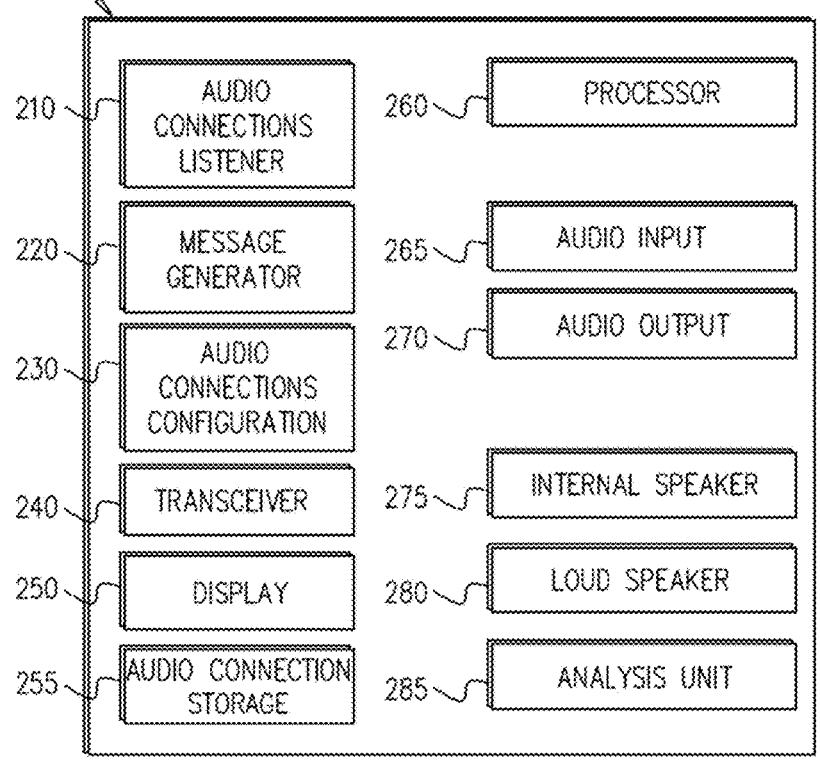
FIG. 2 is a schematic illustration of components of a communication device, according to an exemplary embodiment of the disclosure.

FIG. 2 is a schematic illustration of components of a communication device 200, according to an exemplary embodiment of the disclosure. In an exemplary embodiment of the disclosure, each communication device 200 (e.g. mobile device 115, 150 or landline device 160) may include the following components discussed below:

A transceiver 240 configured to receive and transmit wireless communication signals.

A display device 250 used to display data for the user of the communication device 200, for example data inputted by the user or data regarding incoming calls, and the like.

An audio connections listener component 210 (e.g. a software application), which detects the audio connections used for input and output of audio from the communication device 200. Optionally, the audio connections listener component 210 may detect the audio connections only during phone calls conducted by communication device 200 or continuously while the communication device 200 is activated. In an exemplary embodiment of the disclosure, detection of audio connections may be performed periodically, for example once or twice a second, or upon occurrence of an event. For example, the operating system of communication device 200 notifies the audio connections listener 210 that changes were made with regard to the audio connections of the communication device 200.

In an exemplary embodiment of the disclosure, a list of the audio connection configuration is stored in the communication device 200, for example in an audio connection configuration memory 230. When there is a change in the list, for example connection of an external speaker to the communication device 200 or plugging in an audio input (e.g. external microphone), a processor 260 of the communication device 200 notifies the audio connections listener 210. Optionally, changes to the audio connections may comprise connection to or disconnection from an audio input connection 265, or an audio output 270 of communication device 200.

In an exemplary embodiment of the disclosure, a user of communication device 200 may initiate a phone call to a second communication device 200, while using only a standard internal speaker 275 of the communication device 200, located near the user's ear. During the phone call, the user of the communication device 200 may change the operation mode of the communication device 200 into speaker mode for others to hear the conversation by providing the audio signals via a loud speaker 280. Optionally, audio connections listener 210 detects the change to the audio connection configuration and updates the audio connection configuration memory 230.

In an exemplary embodiment of the disclosure, audio connections listener 210 notifies a message generator 220 of the change in audio connections. For example, by raising a flag associated with use of audio input connections 265 or audio output connections 270, wherein an external device is now connected or disconnected from the communication device 200. The message generator 220 generates a message to be transmitted to the server 140 by the transceiver 240. The server 140 sends the message from the message generator 220 to another communication device 200 via its transceiver 240 and the message is displayed on the display 250 of the other communication device 200. Optionally, the indication to the user of the other communication device 200 may be provided by a text message, a vibration, by an audio message, by a graphic depiction, an image or other methods.

In an exemplary embodiment of the disclosure, the communication device 200 also includes a storage 255 for storing notifications of changes made by other communication devices 200 that conducted communication sessions with communication device 200. For example, when the communication device 200 has a phone call log of the last 100 phone calls, the user of the communication device 200 can review changes made to the operation and of the audio input connections 265 and audio output connections 270 of the communication devices 200 that conducted communication sessions with communication device 200 in each of those 100 phone calls. The storage 255 may store the type of audio input connections 265 and audio output connection 270, the change made, the duration of operation in each audio input connection 265 and audio output connection 270 and the like. For example, the storage 255 may indicate for a specific phone call that a participant used an earphone for the first 2.5 minutes, then used a loud speaker for 12 seconds, then used the mute button for 7 seconds, and then an external speaker for the rest of the conversation, The user may record the phone conversation and compare the content of the conversation to the mode of operation of the audio input connection 265 and/or audio output connection 270 and check after the conversation whether or not sensitive data was provided to the other participant when the other participant's phone was in speaker mode.

In some embodiments of the disclosure, communication device 200 further includes an analysis unit 285 that analyzes the audio signal received from other participants in a communication session to determine the communication status based on the audio signal received from the participant. Optionally, the results of the analysis are compared to information regarding the audio connection configuration provided by the participant who provided the audio signal to determine if there is agreement between the results of the analysis and the configuration information provided.

Figure 3:
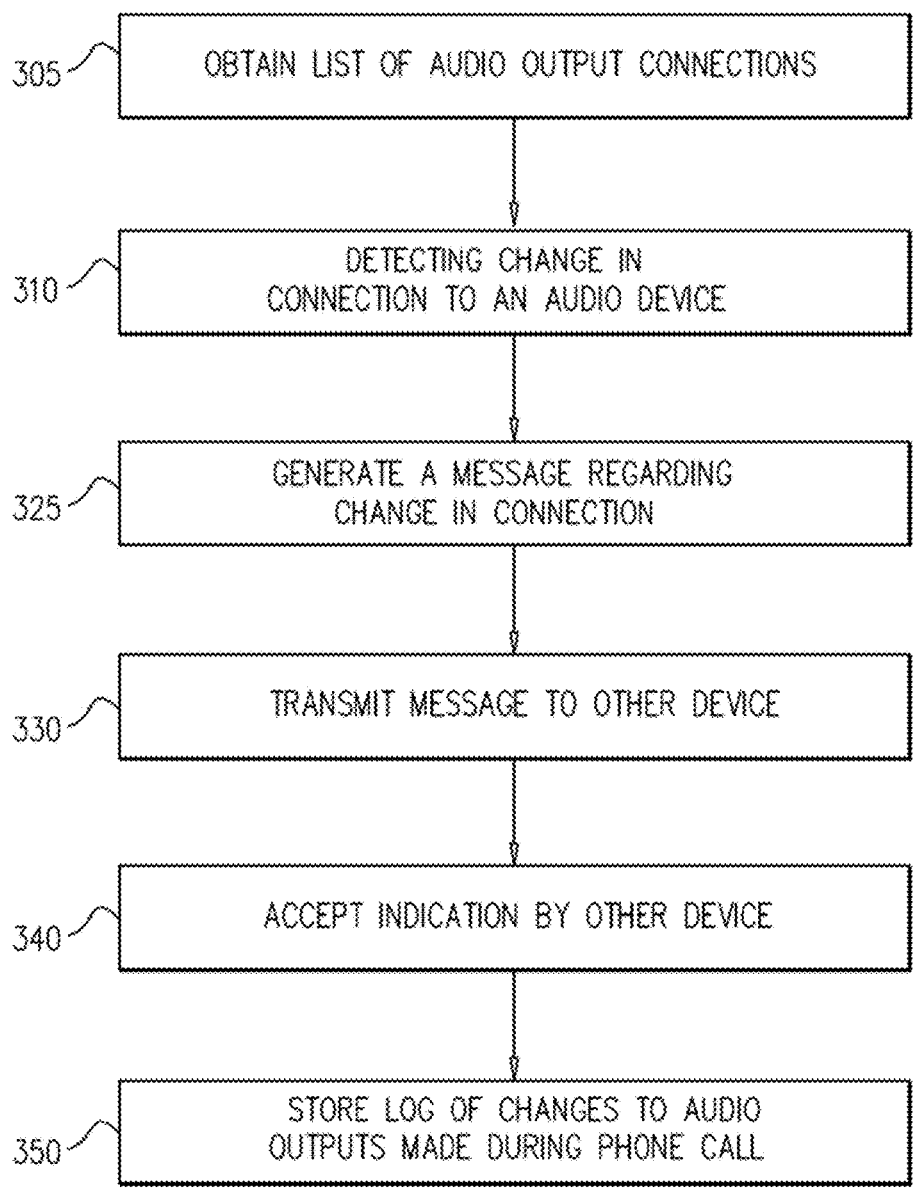
FIG. 3 is a flow diagram of a computerized method of transmitting an indication about connections to audio inputs/outputs of a communication device, according to an exemplary embodiment of the disclosure.

FIG. 3 shows a flow diagram of a computerized method 300 of transmitting an indication about audio output connections 270 of a communication device 200, according to an exemplary embodiment of the disclosure.

Initially communication device 200 obtains (305) a list of audio output connections 270. The list of audio output connections 270 comprises a list of audio output connections 270, such as internal speaker 275, loud speaker 280, earphone, hands-free device and the like. Additionally, the list includes the status of each of the audio output connections 270 (e.g. connected or disconnected, used or not used). For the purpose of this disclosure audio output connection 270 also includes pressing a mute button or inputting a mute command to the mobile phone. The audio output connection 270 may also include recording the phone call.

In an exemplary embodiment of the disclosure, communication device 200 detects (310) a change in the audio output connections 270. Such a change may occur when the user of the communication device 200 connects or disconnects a device from an audio output connection 270, or decides to turn on or turn off a device using an audio output connection 270. The change may also occur due to technical problems of an audio output connection 270, for example when an earphone fails to receive signals from the device, the device automatically stops using the earphone. The detection of changes in the audio output connection 270 may be performed by an audio application listener 210 that is executed on the communication device 200. The audio application listener 210 monitors a list of audio output connections 270 or is embedded into the operating system of the communication device 200 to detect (310) the change in the audio output connection 270.

In an exemplary embodiment of the disclosure, upon detecting the change a message is generated (320) to be sent to a second communication device 200, for example via the server 140. Optionally, when initially installing applications (e.g. 125, 155) on the communication devices 200, the users of the communication devices 200 register at the server 140, including the phone number and personal details of the user. When detecting a change in connections or operation of the audio outputs, the message is sent to the proper communication device 200 by the server 140 according to the data received during registration. Alternatively or additionally, the information from the communication session or the open communication connection is used to notify the participants of the communication session.

In an exemplary embodiment of the disclosure, the message is transmitted (330) directly or indirectly (e.g. via server 140) to the other communication devices 200 participating in the communication session. Optionally, the message is accepted (340) by the other communication devices as an indication of change to audio output connections 270 of the transmitting communication device 200. The indication may be provided as a textual message that is displayed on the display 250 of the other communication devices 200, a vibration on the other communication devices 200, a sound indication, for example text to speech of the message sent and the like. Optionally, the indication is provided to the users of the other communication devices in real time, during the phone call, such that the users of the other communication devices 200 knows whether or not it is safe to share sensitive data with the users of the transmitting communication device 200.

In an exemplary embodiment of the disclosure, the message may provide information regarding the following parameters:

1. A pre-caller indication—notifying that a participant is starting to use a loudspeaker;
2. Bluetooth activation—notifying that a participant is activating a Bluetooth device;
3. Silent Mode—notifying that a participant has muted his microphone;
4. RSSI—received signal strength indication to determine if the participant has strong enough reception;
5. Wi-Fi Status—notifying the status of Wi-Fi connections to the participant's device;
6. Conference Mode—notifying when adding or removing members of a conference call;
7. Secured Call—indicating that a call is secure;
8. File sharing—indicating if a participant is going to share a file (e.g. via WhatsApp);
9. Recording Indication—notifying if a participant is recording the conversation;
10. Battery indication—notifying if a participants battery is running low and there is a risk that the conversation may be disconnected.

In an exemplary embodiment of the disclosure, communication device 200 stores (350) a log of the changes in connection and operation of audio outputs during the communication session. For example, a user of a communication device 200 has a log of phone calls with many users. In each phone call, the user may view if and when the other participant changed the operation or connection of any audio output. For example, in an 8 minutes phone call, the log of changes may show that between the second and fifth minute, the phone device of the other participant was on speaker mode, and the last 45 seconds of the phone call was recorded by the other participant (e.g. by connecting a recording device).

In an exemplary embodiment of the disclosure, the difference between the audio signal received over a cellular network from a user talking directly into the communication device (close talk) and a user talking at a remote position from the communication device (far talk) can be determined by experimentation.

Figure 4:
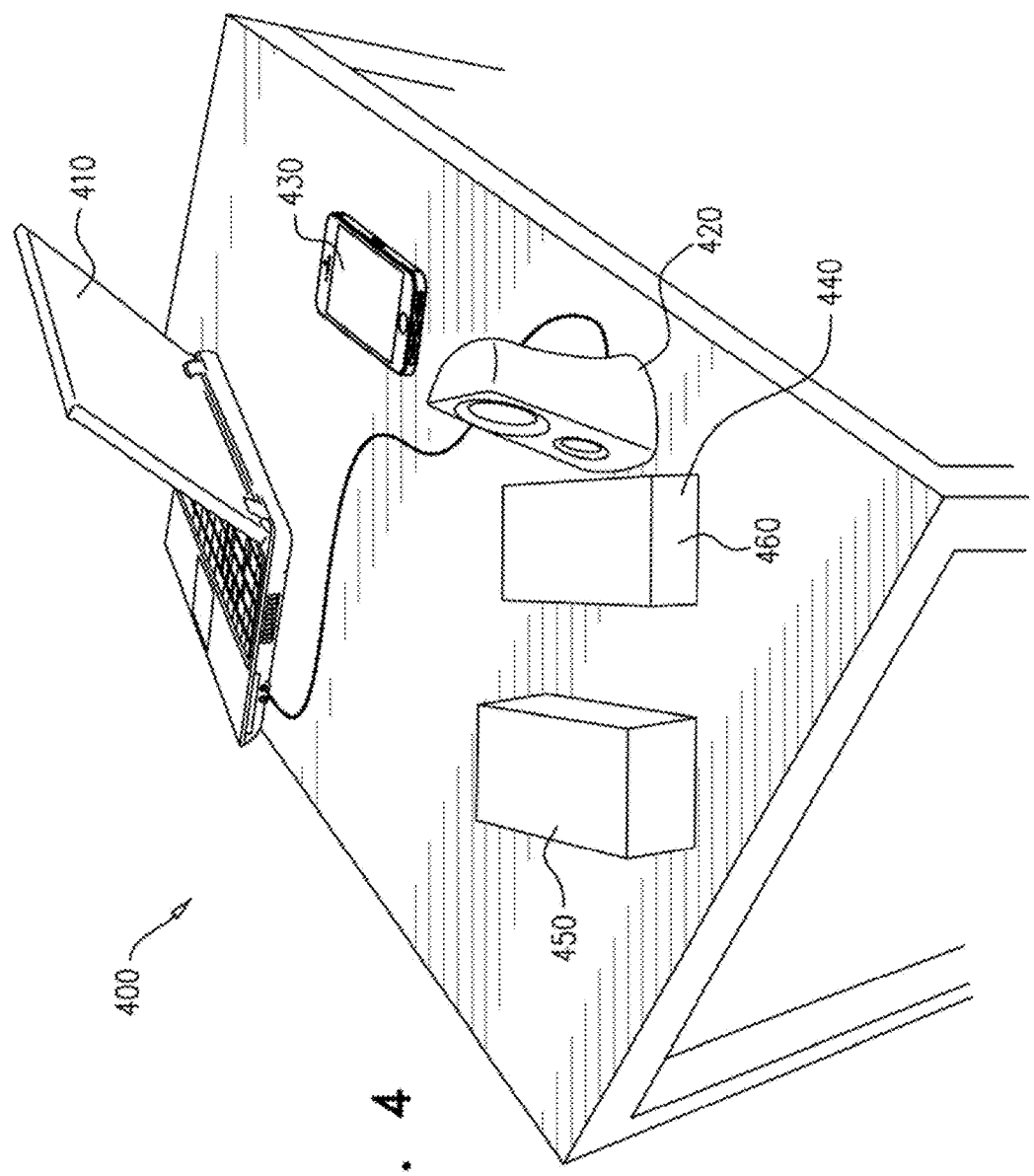
FIG. 4 is a schematic illustration of an experiment setup for testing the difference between close talk and far talk, according to an exemplary embodiment of the disclosure.

FIG. 4 is a schematic illustration of an experiment setup 400 for testing the difference between close talk and far talk, according to an exemplary embodiment of the disclosure. In setup 400 a computer 410 is used to provide sounds from a speaker 420. A mobile communication device 430 is used to accept audio signals and transmit them to a remote communication device for analysis (e.g. a general purpose computer over network 130 or e.g. to communication device 150 e.g. by application 155 that is installed directly on the mobile communication device 150).

In some cases the mobile communication device 430 is placed in position 440 near the speaker 420 (e.g. 1-5 cm from the speaker) to measure audio signals in close talk and in some cases mobile communication device 430 is placed in position 450 (e.g. 15-20 cm from the speaker) to measure audio signals in far talk.

Figure 5:
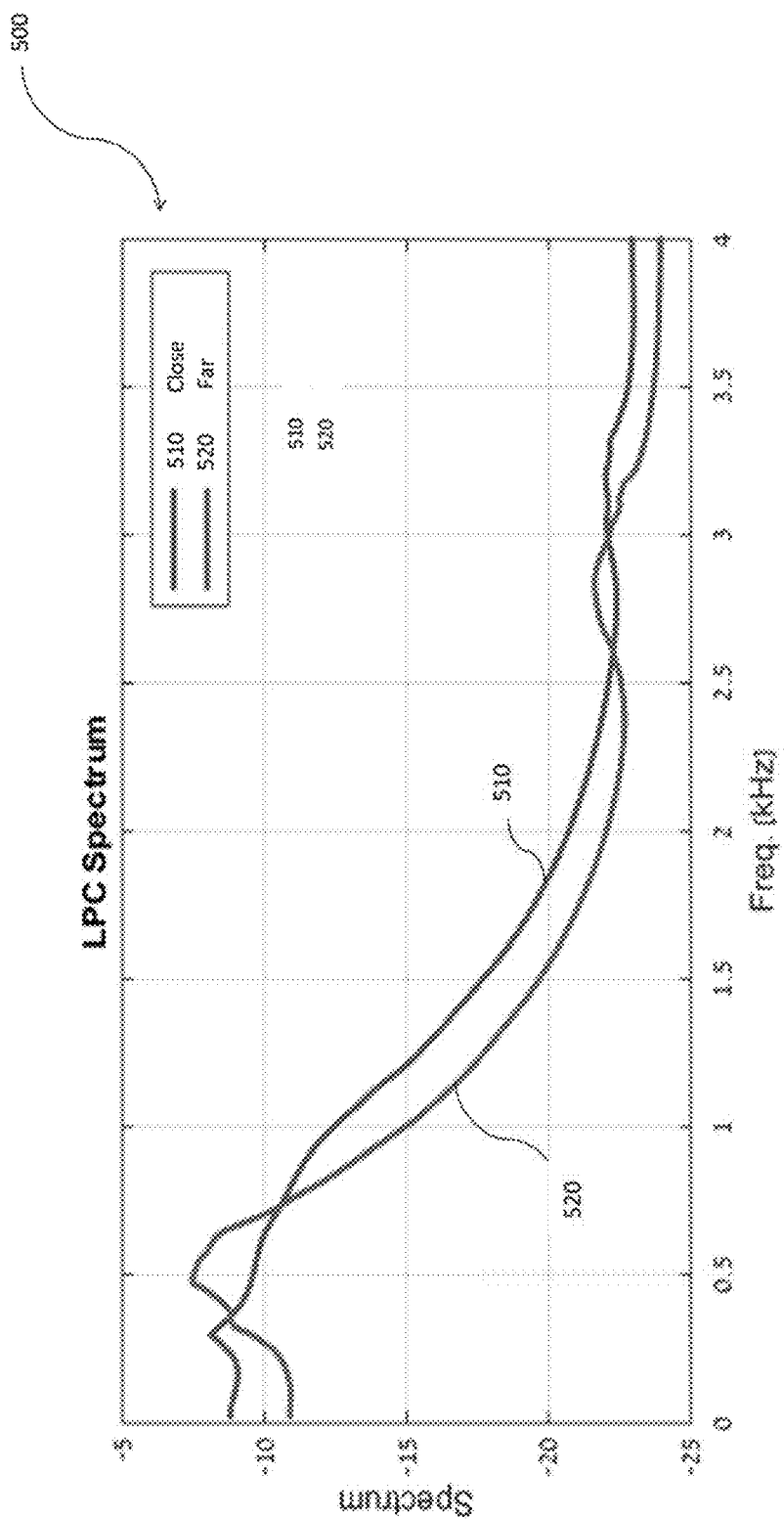
FIG. 5 is a graph of an LPC spectrum of an audio signal recorded in close talk relative to far talk, according to an exemplary embodiment of the disclosure.

FIG. 5 is a graph 500 of an LPC spectrum of an audio signal recorded in close talk 510 relative to far talk 520, according to an exemplary embodiment of the disclosure. The general difference in the Linear predictive Coding (LPC) between close talk and far talk is that for close talk the LPC spectrum tends to generally decay, whereas for far talk the LPC spectrum shows a peak before decaying and after decaying (two peaks), for example as shown in FIG. 5.

Figure 6:
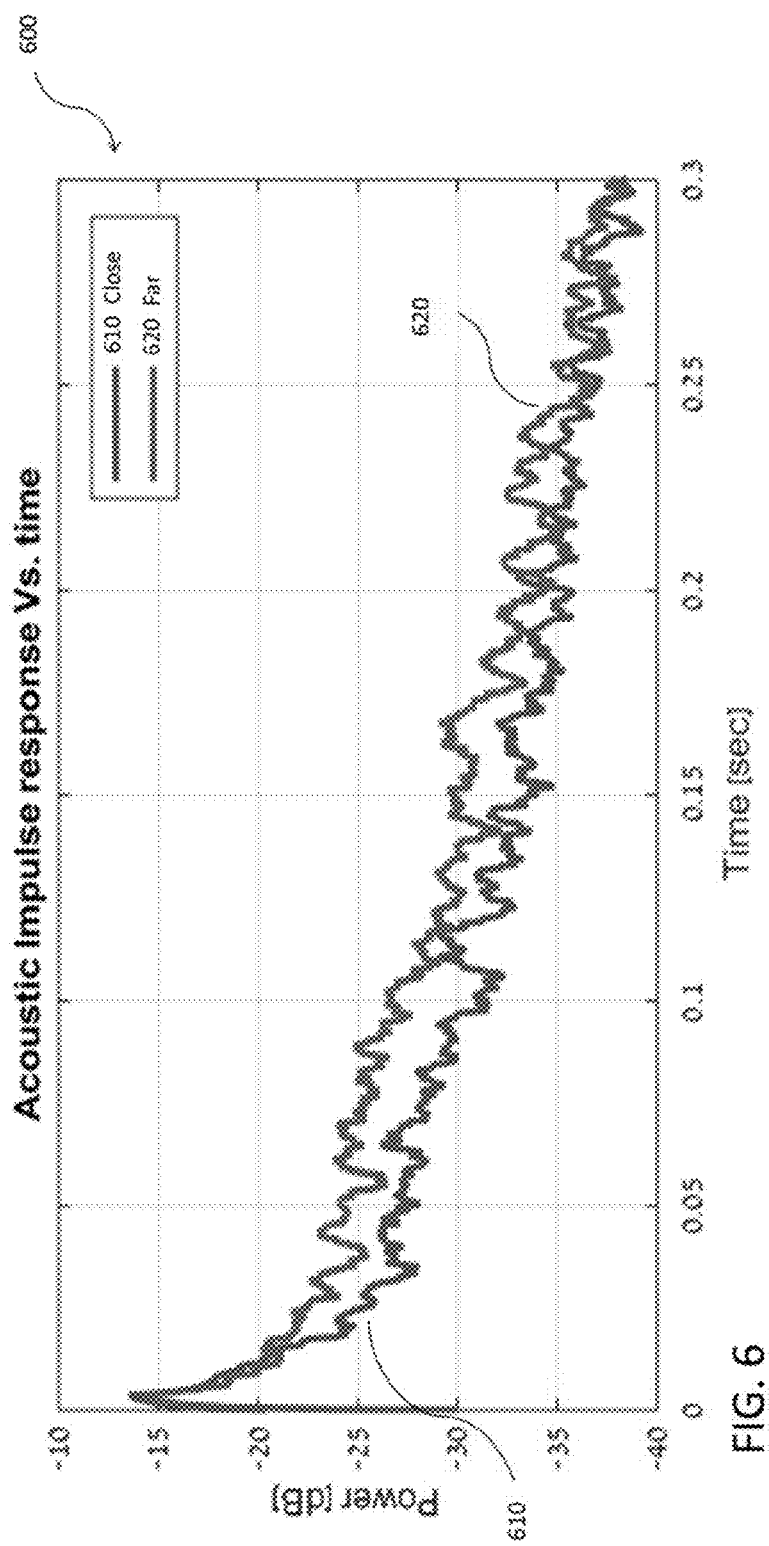
FIG. 6 is a graph of the measured signal power (dB) as a function of time for close talk and far talk, according to an exemplary embodiment of the disclosure.
Figure 7:
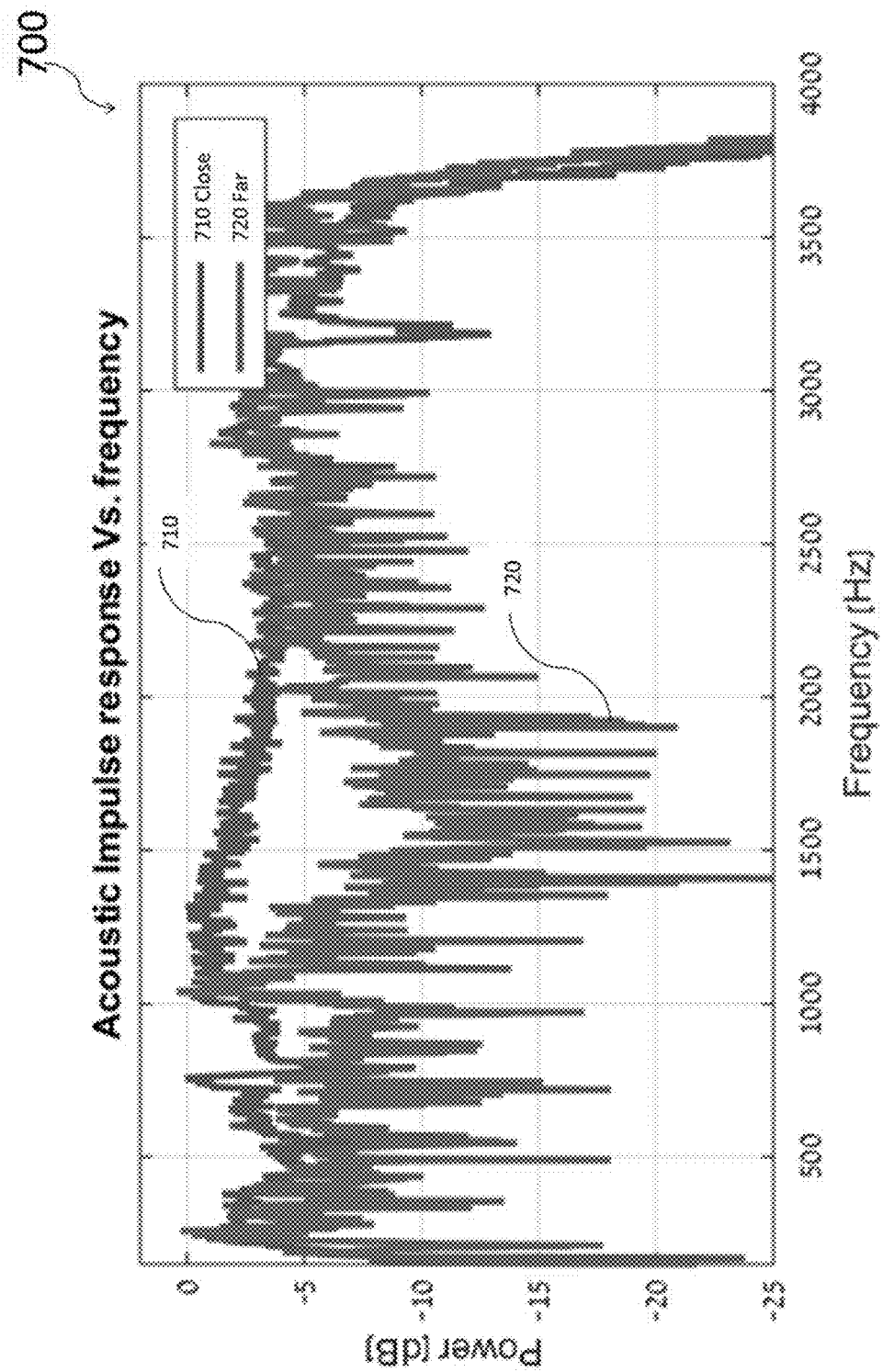
FIG. 7 is a graph of the measured signal in frequency domain for close talk and far talk, according to an exemplary embodiment of the disclosure.

The audio signal transmitted by speaker 420 were initially chirping sounds to make it easier to measure the acoustic transfer function (ATF) over the cellular network. FIG. 6 is a graph 600 of the measured signal power (dB) as a function of time for close talk 610 and far talk 620. Likewise FIG. 7 is a graph 700 of the measured signal in frequency domain for close talk 710 and far talk 720. In time domain it is evident that the far talk case 620 incorporates more reverberation (longer reverb) than in the close talk case 610. Likewise in frequency it can be seen that for the far talk case 720 the ATF is much more "peaky" with huge differences between neighboring bands. Optionally, two bands that are only a few Hz from each other can have a 20 dB difference in power. Moreover the "two hill pattern" that was seen in FIG. 5 can also be recognized in FIG. 7.

In an exemplary embodiment of the disclosure, the audio signal is made from a collection of voice signals, wherein some are of men and some are of women to check if it effects the results. Additionally, multiple languages can be used, for example English, Spanish, Chinese, Dutch, Hebrew, Arabic and even Finnish, to determine if there is an effect on the results.

Likewise, 4 audio configurations were tested:
1. With the mobile communication device 430 in position 440 (close talk);
2. With the mobile communication device 430 in position 440 and with the audio signal from speaker 420 attenuated by 10 dB;
3. With the mobile communication device 430 in position 450 (Far talk) and with a box 460 between speaker 420 and the position (pos #3);
4. With the mobile communication device 430 in position 450 (Far talk) and without box 460 between speaker 420 and the position (pos #4).

Figures 8, 9:
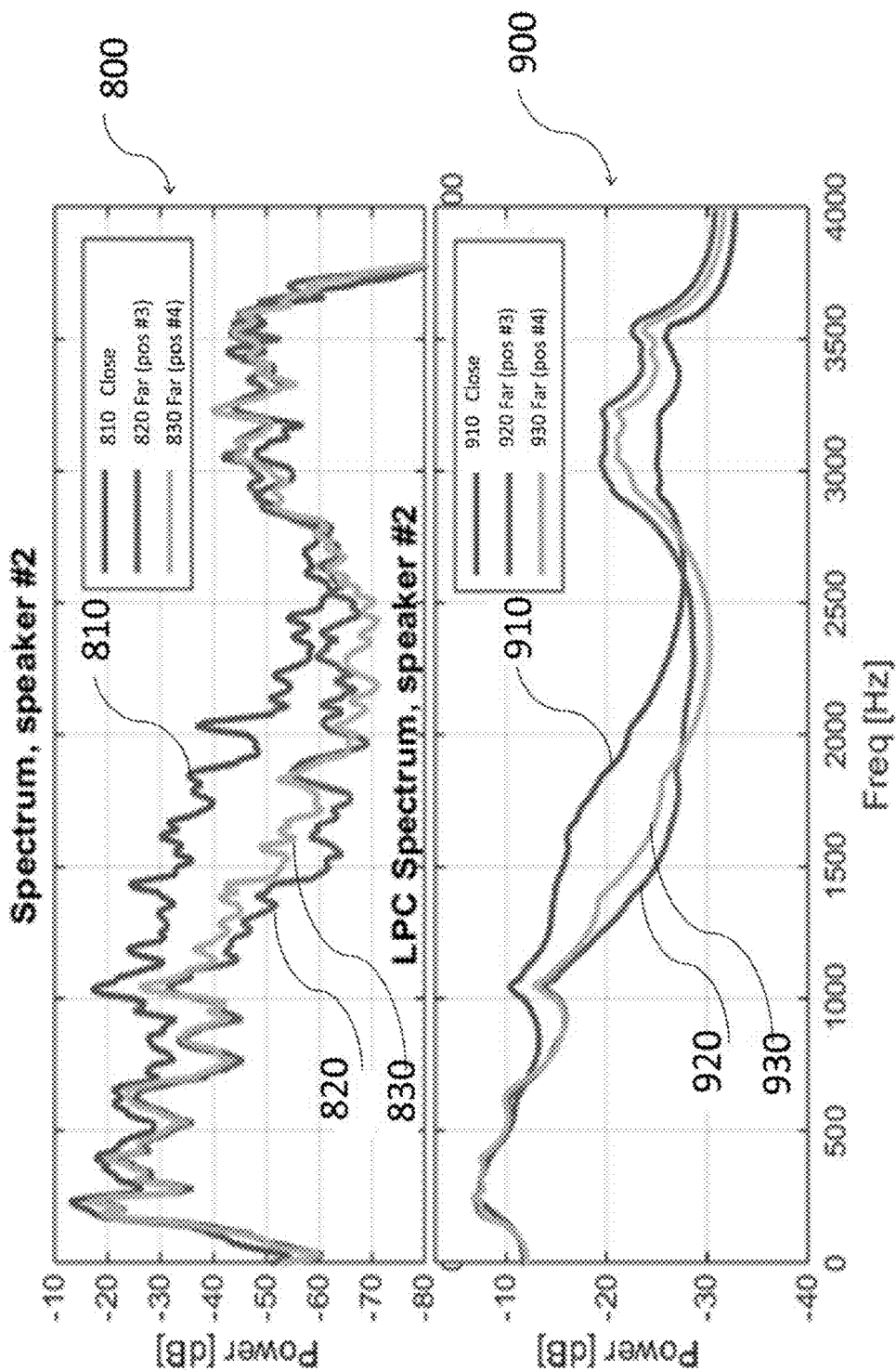
FIG. 8 is a graph of a power spectrum for close talk and far talk in frequency domain, according to an exemplary embodiment of the disclosure.
FIG. 9 is a graph of an LPC spectrum of an audio signal recorded in close talk relative to far talk, according to an exemplary embodiment of the disclosure.

Exemplary results of the experiments are depicted in FIG. 8 and FIG. 9.

FIG. 8 is a graph 800 of a power spectrum for close talk 810 and far talk (820 (pos #3), 830 (pos #4)) in frequency domain; and FIG. 9 is a graph 900 of an LPC spectrum of an audio signal recorded in close talk 910 relative to far talk (920 (pos #3), 930 (pos #4)) according to an exemplary embodiment of the disclosure.

It can be seen from the graphs (800, 900) that there is a significant difference between an audio signal recorded in close talk and far talk, thus enabling a remote communication device 150 to determine the audio output configuration in the communication session that was conducted by communication device 430.

Optionally, Gaussian vector classification can be used to differentiate between close talk and far talk with an audio signal.

In an exemplary embodiment of the disclosure, when a far talk signal travels through the cellular network, the mid-frequencies are strongly attenuated, compared to the close talk signal. It is assumed that the quality of the far talk signal is low, and hence strongly manipulated by a speech enhancement unit (that is standardly provided on mobile devices) on the device. What is left after this manipulation is mainly the voiced speech main power (200-1200 Hz) and the unvoiced speech main power (2200-3500 Hz). The mid band (1200-2200 Hz) is strongly attenuated because it is less important for intelligibility than the low and high bands.

Following is a mathematical formulation for the analysis described above. First, we denote the LPC-spectrum (LPCS) by $S_t(k)$, where t denotes the time-frame index, and k the frequency index in the short time Fourier transform (STFT) domain. Second, we describe the online estimation of $S_t(k)$. Assume that $S_{t-1}(k)$ was estimated at time frame t−1 for every frequency band k. The LPCS is updated using the recursive formula $$(*) S_t(k) = \lambda \cdot S_{t-1}(k) + (1-\lambda) \cdot \tilde{S}_t(k),$$

where $0<\lambda<1$ is the smoothing coefficient, and $\tilde{S}_t(k)$ is the instantaneous LPC spectrum calculated by $$(**) \tilde{S}_t(k) = \frac{\sigma_w^2[t]}{\left|1 - \sum_{p=1}^{P} a_p[t] \cdot e^{-\frac{2\pi jkp}{K}}\right|^2},$$

and $a_1[t], \ldots, a_P[t], \sigma_w^2[t]$ are the LPC coefficients estimated at the t-th time frame. The calculation of the LPC parameters is performed as commonly practiced in audio processing. We choose the value of the smoothing coefficient $\lambda$ by the rule of thumb $$\lambda = 1 - \frac{1}{T_{smt}},$$

where $T_{smt}$ is the number of time frames on which smoothing is executed. For example, if one decides to smooth over 13 time-frames, the coefficient $\Delta = 1 - 1/13 \cong 0.92$ will be used.

Parametric Statistical Model

Define the following vector of the spectrum coefficients:

$$S = [S_t(0), S_t(1), \ldots, S_t(K-1)]^T$$

where K is the number of frequency bands and is subject to tuning and tradeoff. For example, when long time-frames are used, K is larger and vice versa. However, zero-padding or frame folding can be used to reduce or enlarge K as needed. Therefore, the size of K should be determined empirically, finding the size that gives the best performance. Guiding lines are—large K gives a better resolution, but also a high dimension that costs in computation and statistical perturbation. We attribute X a Gaussian statistical model by the following probability density function (p.d.f.), $$(***) S_t(k) \sim f(S(k)) = \frac{1}{\sqrt{2\pi\sigma_s^2(k)}} \exp\left(-\frac{(S(k) - \mu_s(k))^2}{\sigma_s^2(k)}\right),$$

where $\mu_s(k)$ and $\sigma_s^2(k)$ are the mean and variance of the Gaussian random variable $X_t(k)$.

Now, we learn $\mu_s(k)$ and $\sigma_s^2(k)$ from the database, differently for close talk and far talk, so we denote it by $$(****) \mu_c(k), \sigma_c^2(k)$$

$$\mu_f(k), \sigma_f^2(k).$$

In summary, the training step is done by the following procedure:
1. New observations are measured: $y_t(1), \ldots, y_t(K)$. Note: these are in the STFT domain.
2. The LPC parameters are calculated: $a_1[t], \ldots, a_P[t], \sigma_w^2[t]$.
3. The LPCS is calculated by (**), and smoothed by (*) to obtain $S_t(k)$.
4. Repeat 1-3 for far talk and close talk databases.
5. The mean and average values of $S_t(k)$ are calculated for the close talk and far talk, denoted as in (****) above.

Classification Algorithm

With the trained parameters in (**), a new frame can be classified using a-posteriori probability of each hypothesis. The close talk and far talk hypotheses are denoted by $H_c$, $H_f$, respectively. Further denote the p.d.f.s regarding the close and far hypotheses by $f_c(S_t(k))$ and $f_c(S_t(k))$, respectively, where $f_f(S_t(k))$ is obtained by substituting $\mu_s(k) \leftarrow \mu_f(k)$ and $\sigma_s^2(k) \leftarrow \sigma_f^2(k)$ in (*), and $f_c(S_t(k))$ is obtained similarly using $\mu_c(k), \sigma_c^2(k)$. Now, the a-posteriori probabilities of close talk and far talk hypotheses are given by:

$$p_c(t, k) = P\{H_c \mid S_t(k)\} = \frac{1}{1 + \zeta(t, k)}$$

$$p_f(t, k) = P\{H_f \mid S_t(k)\} = \frac{1}{1 + \zeta^{-1}(t, k)}$$

$$\zeta(t, k) = \frac{f_f(S_t(k))}{f_c(S_t(k))}.$$

The online classification procedure is detailed below:
1. New observation is measured, and $S_t(k)$ is calculated identically to the training procedure.
2. Calculate the a-posteriori values $f_f(S_t(k)), f_c(S_t(k)), \zeta(t,k), p_c(t,k), p_f(t,k)$.
3. Integrate the a-posteriori probabilities by averaging in frequency domain, and smoothing over time domain:

$$p_c(t) = P\{H_c \mid \{S_\tau(\kappa): \tau = -\infty, \ldots, t, \kappa = 0, \ldots, K-1\}\}$$

$$= \alpha \cdot P_c(t-1) + (1-\alpha) \cdot \left[1/K \cdot \sum_{\kappa=0}^{K-1} p_c(\tau, \kappa)\right],$$

where $0<\alpha<1$ is a constant time smoothing coefficient.

In an exemplary case the following values are calculated: 1) the LPCS of a close talk signal in STFT domain, 2) $p_c(t,k)$, 3) $p_f(t,k)$, and 4) $P_c(t)$. Typically the values of $P_c(t)$ are higher than 50% when close talk speech is present.

In some embodiments of the disclosure, the support vector machine (SVM) approach can be used for classification, to determine if an audio signal is close talk or far talk.

In phone conversations, the transmitting device collects audio signals using a microphone. Except for the desired speech signal, inevitable noise is also recorded. In far talk, the relative power of the speech signal is lower, as compared to a close talk scenario, i.e., the SNR is lower. Optionally, a spectral enhancement (SE) approach can be used to evaluate the SNR level, and use it to determine between close talk and far talk.

In some embodiments of the disclosure, a variant of the log spectral amplitude (LSA) estimator can be used to estimate the SNR.

The algorithm steps are detailed below:
1. New observation is obtained, as in previous sections.
2. The SNR of each STFT bin is estimated, using the LSA algorithm, denoted by $\xi(t,k)$.
3. Calculate the average SNR of this time frame by $\xi(t) = 1/K \cdot \sum_{\kappa=0}^{K-1} \xi(t,\kappa)$
4. An alert of far talk is raised in time frame t if $\xi(\tau) < \xi_{min}$ for all $\tau = t-L, t-L+1, \ldots, t$. In words, if the SNR is lower than $\xi_{min}$ for a significant amount of time, i.e., L time-frames.

Note: the values of $\xi_{min}$ and L are determined empirically by using our database, as will be discussed in the following section.

In an exemplary embodiment of the disclosure, the performance of the SE method is evaluated, and the initial values of $\xi_{min}$ and L that will be used in the application are calculated. For that, we enlarged the database as follows.

Using setup 400 as described above, numerous recordings were performed with different values of SNR. The desired signal was taken from the ITU speech database including speech with the following characteristics:

~6 min long, 20 different speakers, 10 different languages, and the noise was a babble noise. The SNR levels are 0 and 10 dB, different transmitting devices were used, and each recording was done twice: using close talk and far-talk setups. Likewise other noise environments may also be used, for example: machine noise, street noise, car noise, etc. Likewise real human speakers may be used instead of recordings.

It should be noted that the SNR used in the database creation with the SNR values estimated by the algorithm. When recording the database, the SNR is defined as the ratio between the desired and noise signals in the transmitting room (the room where the transmitting device is located). In the database, the SNR is defined as the ratio between the SE-cleaned signal and the SE-estimated noise at the recording device.

Figure 10:
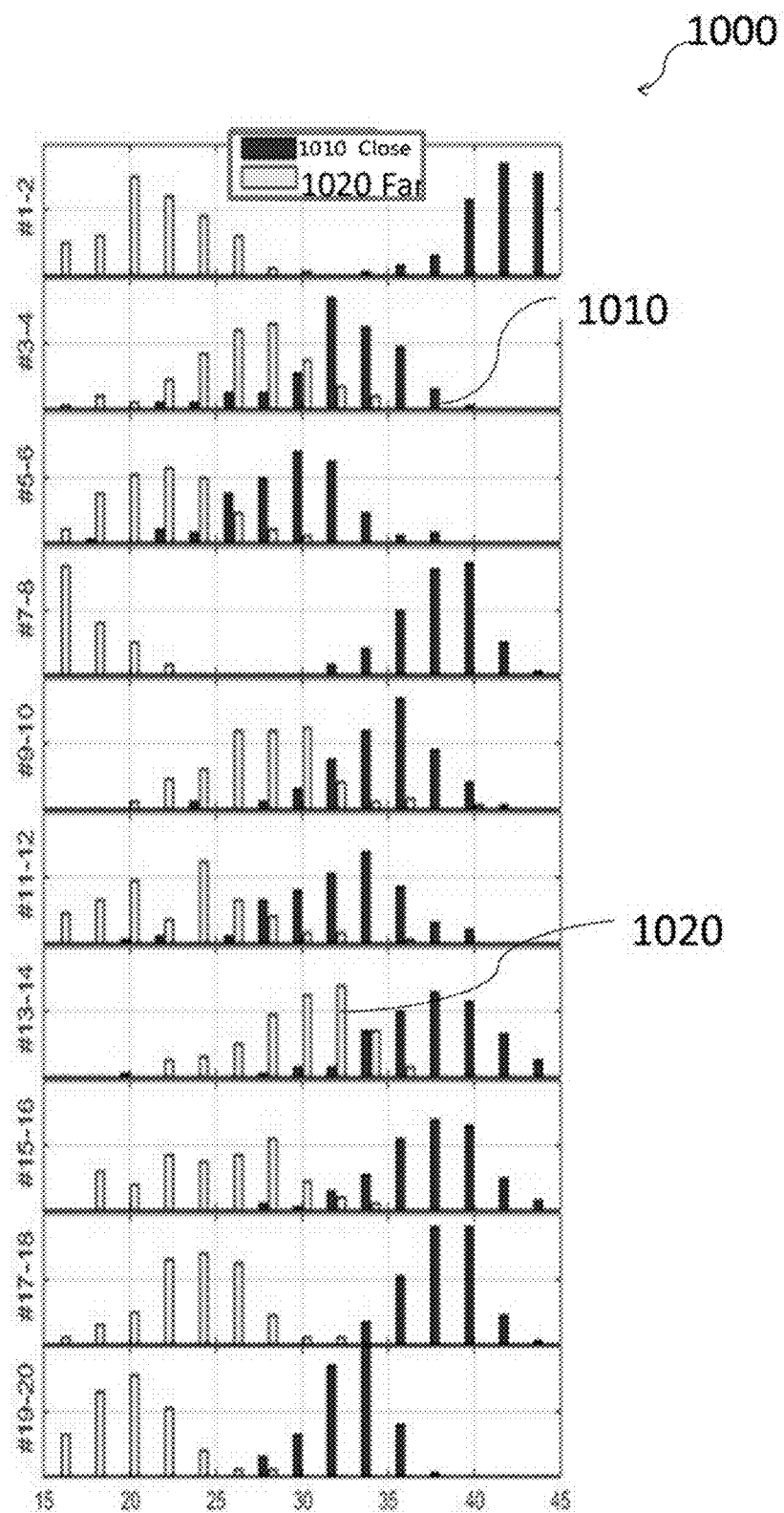
FIG. 10 is a graph depicting distribution results of estimated SNR values for close talk and far talk, according to an exemplary embodiment of the disclosure.

FIG. 10 is a graph 1000 depicting distribution results of estimated SNR values for close talk 1010 and far talk 1020.

In an exemplary embodiment of the disclosure, in each row, the SNR value distribution of a specific experiment is shown; for example, the first row shows the SNR distribution when the transmitting device is LG G2, in close talk (dark) and far talk (light) scenarios. It seems that $\xi_{min}$=30 dB is a good separator between close talk and far talk scenarios.

As for the value of L, experiments show that using L=2/M fits, where M is the number of time-frames per second, i.e., waiting for 2 seconds with low SNR to raise a far talk alert.

In an exemplary embodiment of the disclosure, as in the SNR evaluation, a spectral method for signal to noise and reverberation ratio (SNRR) is applied. Then, using the enhanced signal, we calculate the SNRR as the ratio between the enhanced signal and the attenuated interference (noise+reverb in this case). An overview of the algorithm is:
1. STFT—transformation of a frame of samples to the frequency domain for processing.
2. Estimation of noise power spectral density (PSD), denoted by $\phi_n(t,k)$. The estimator is based on the decision-directed (DD) approach by Ephraim and Malah, and is slowly time-varying.
3. Estimation of the average PSD of the signal, denoted by $\phi_x(t,k)$, simply by smoothing.
4. Estimation of the reverberant speech PSD, denoted by $\phi_r(t,k)$. Direct path compensation (DPC) can be included or not.
5. Estimation of the late reverberant speech PSD, denoted by $\phi_{tr}(t,k)$.
6. Using the above PSDs, calculate the gain function using one of several optimization criteria.
7. Apply a minimum gain constraint, and filter the signal in the STFT.
8. Inverse Short Time Fourier Transformation (ISTFT).

SNR and SNRR Histogram Analysis

In an exemplary embodiment of the disclosure, when speaking in a car, without holding the device, but using either the device's speaker mode, or car speaking system. The car speaking system usually uses a BlueTooth (BT) connection to the device, and this speaking system can be built in by the car manufacturer, or installed by the customer. Using the spectral methods for denoising and dereverberation, it seems we have the basis for classification. The (intuitive) assumption is that we can indicate the far talk in office by the low SNRR values, and far talk in car is characterized by low SNR values.

Histograms 1100 of SNRR in Office

In an exemplary embodiment of the disclosure, several signals were recorded in an office (which was a small, but reverberant, room), the SNRR values in each STFT bin were measured. Afterwards, the distribution of the SNRR values was analyzed, and this is shown in FIGS. 11a to 11h. The first figure (FIG. 11a was calculated using the entire signal).

As expected, close-talk 1110 has higher SNRR values than far talk 1120, which can be used for classification. To emphasize the difference, we use a VAD, and calculate the distributions in active frame, or alternatively, in non-active frames (see FIGS. 11b and 11c).

Figure 11A:
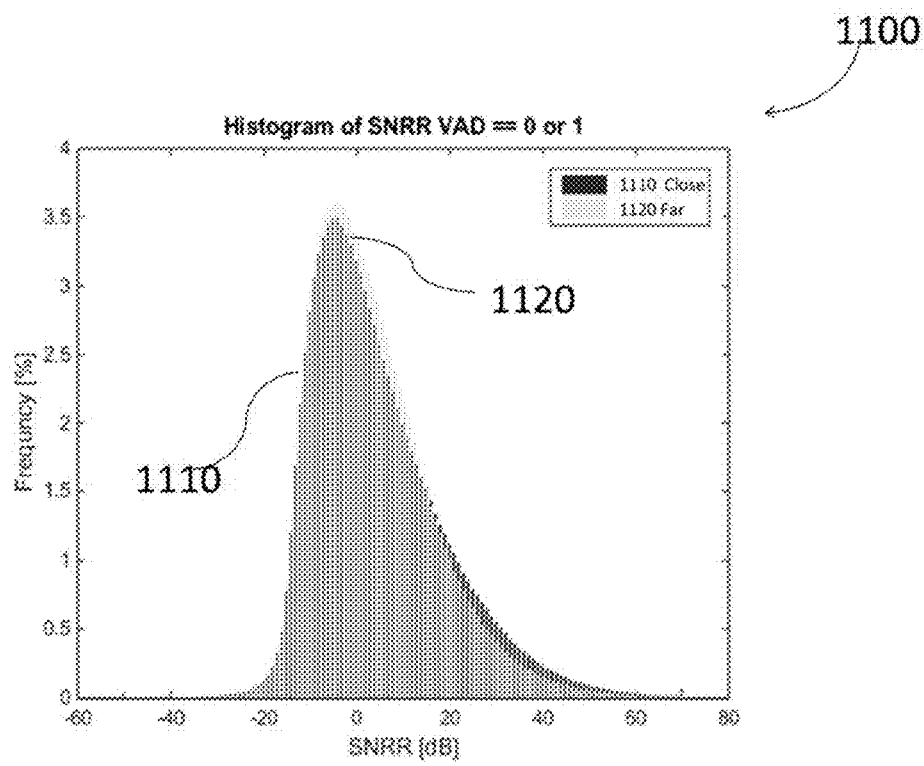
FIGS. 11a to 11i are histograms of a signal to noise and reverberation ratio for various cases, according to an exemplary embodiment of the disclosure.
Figure 11B:
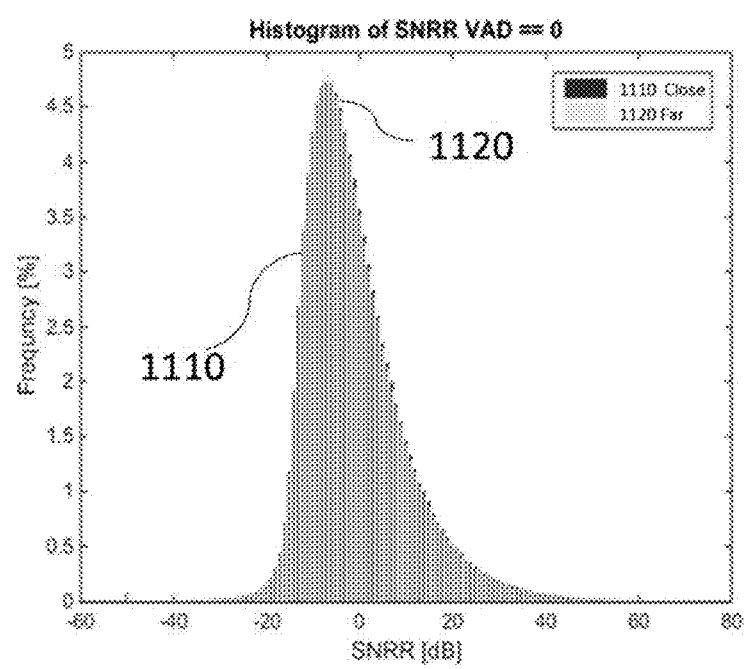
Figure 11C:
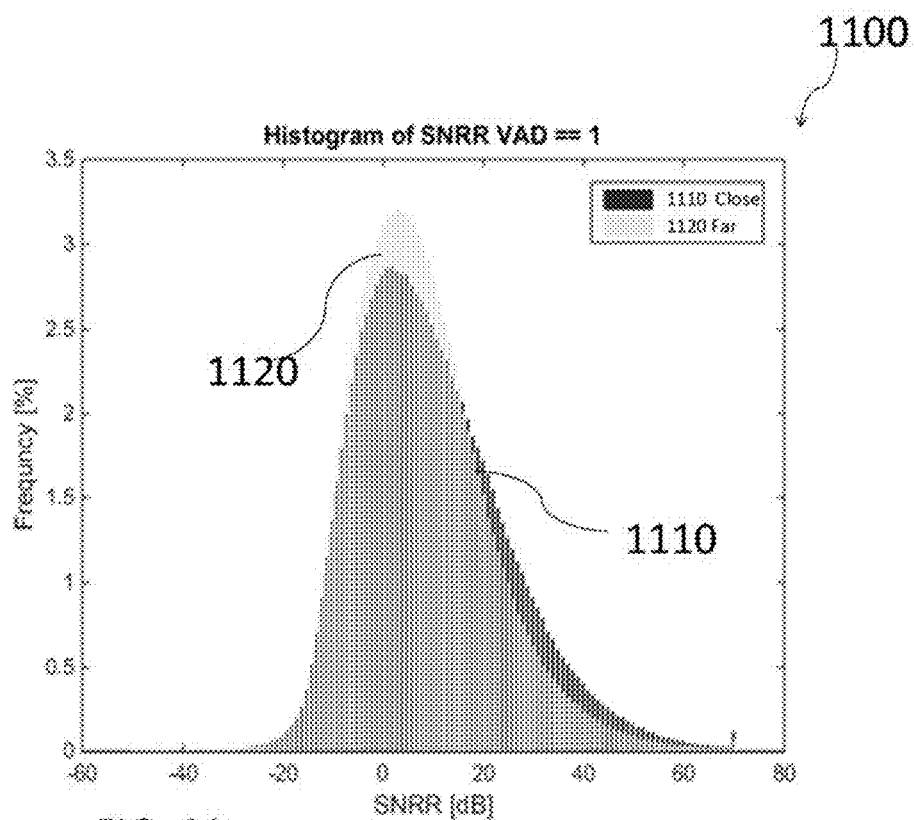
Figure 11D:
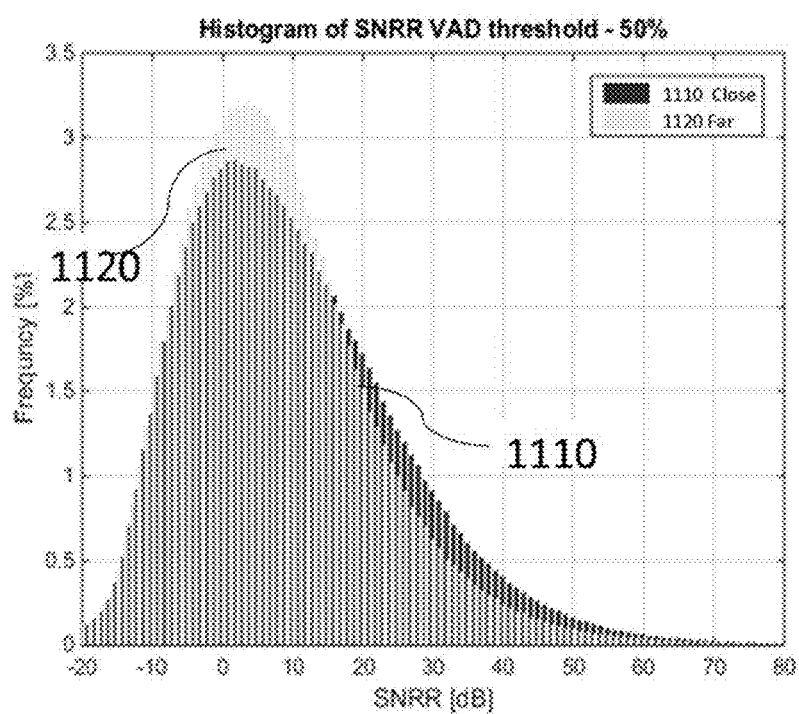
Figure 11E:
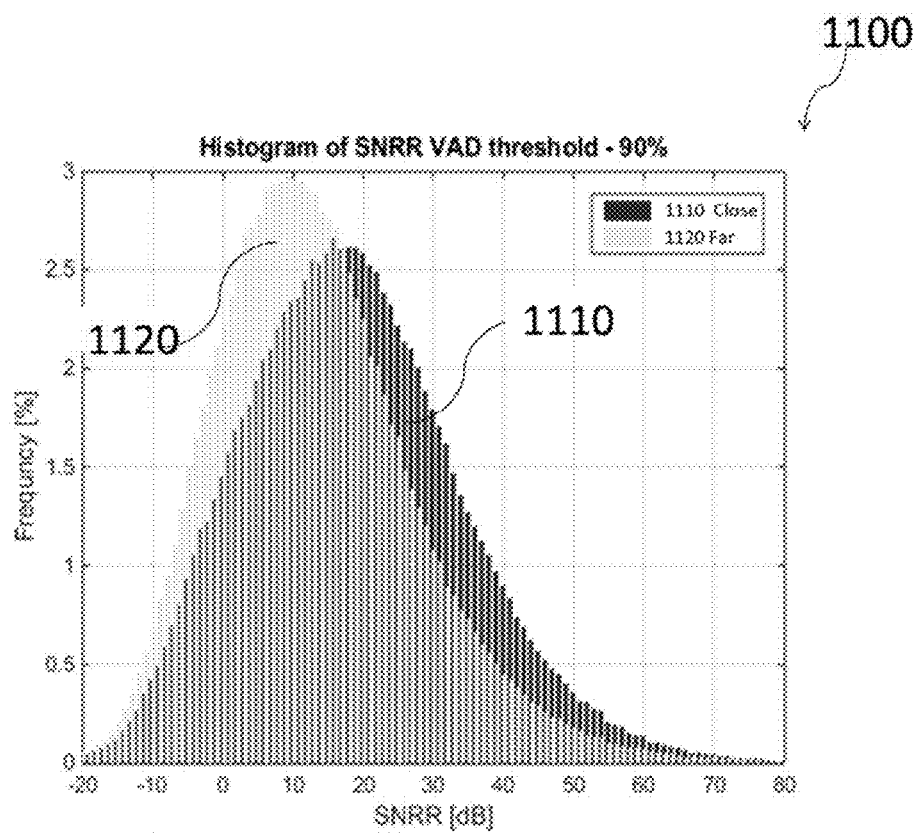

Obviously the difference lies in the active parts of the signal. These results encourage us to raise the VAD threshold. In the figure above, if the power of a frame is higher than the median power—we call it active, and vice versa. We might want to indicate speech only when the power is higher than 90% of the frames, and expect to have even stronger classification, as is shown in FIG. 11d and FIG. 11e). Accordingly, the DRR values can be used for classification in a room.

Histograms of SNR in an Office

Figure 11F:
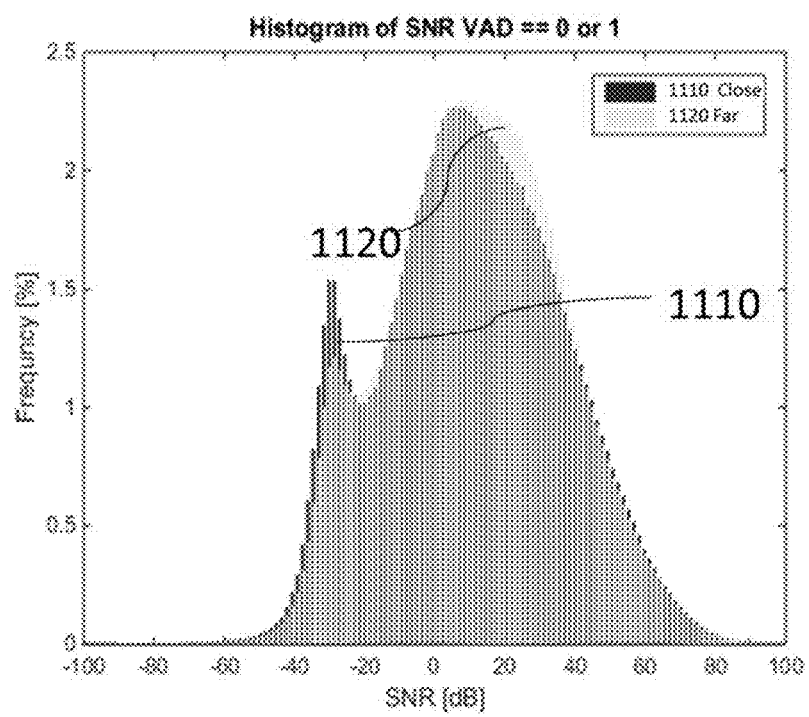
Figure 11G:
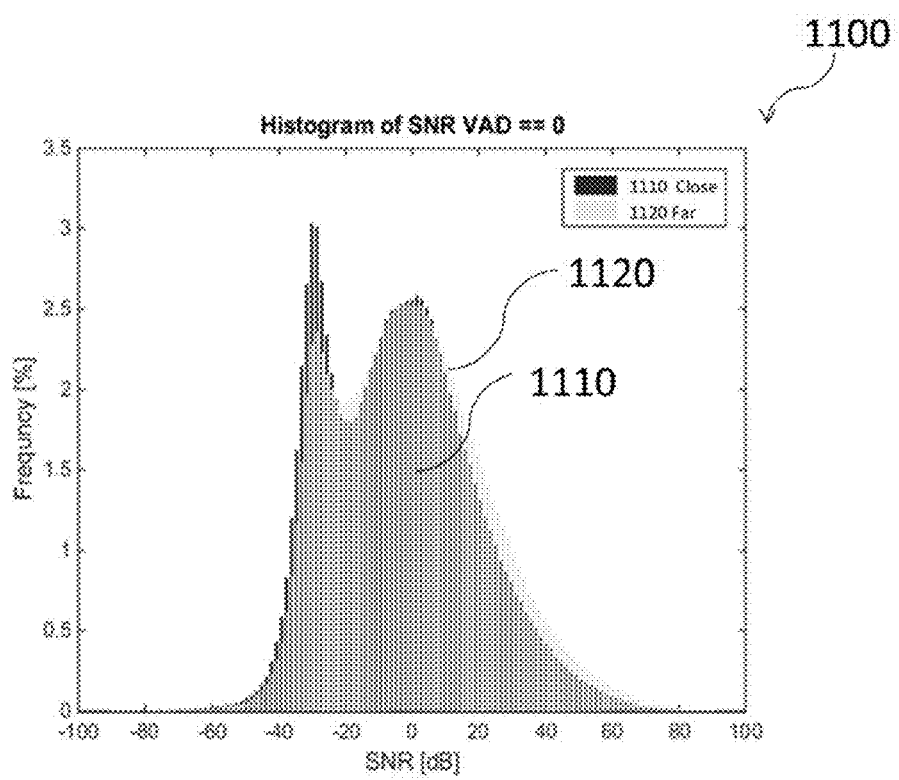
Figure 11H:
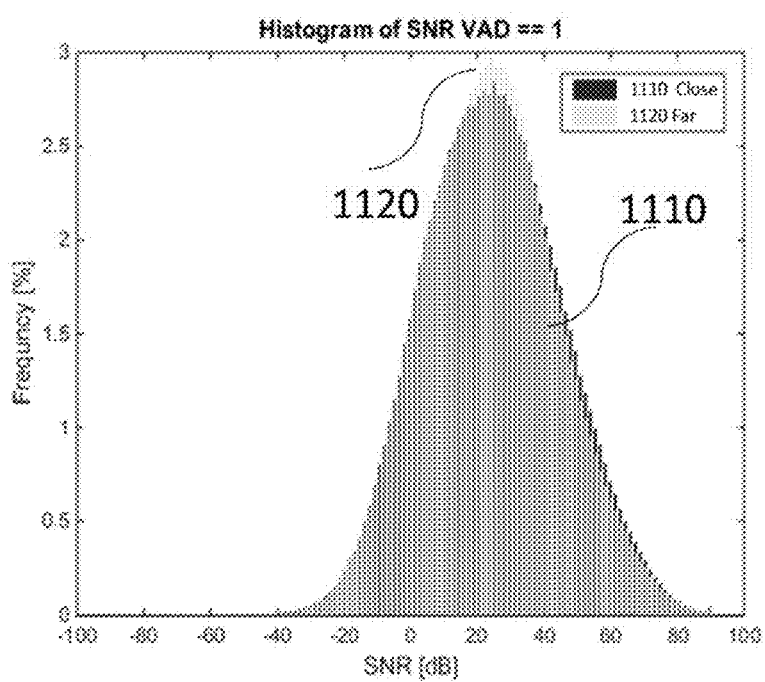
Figure 11J:
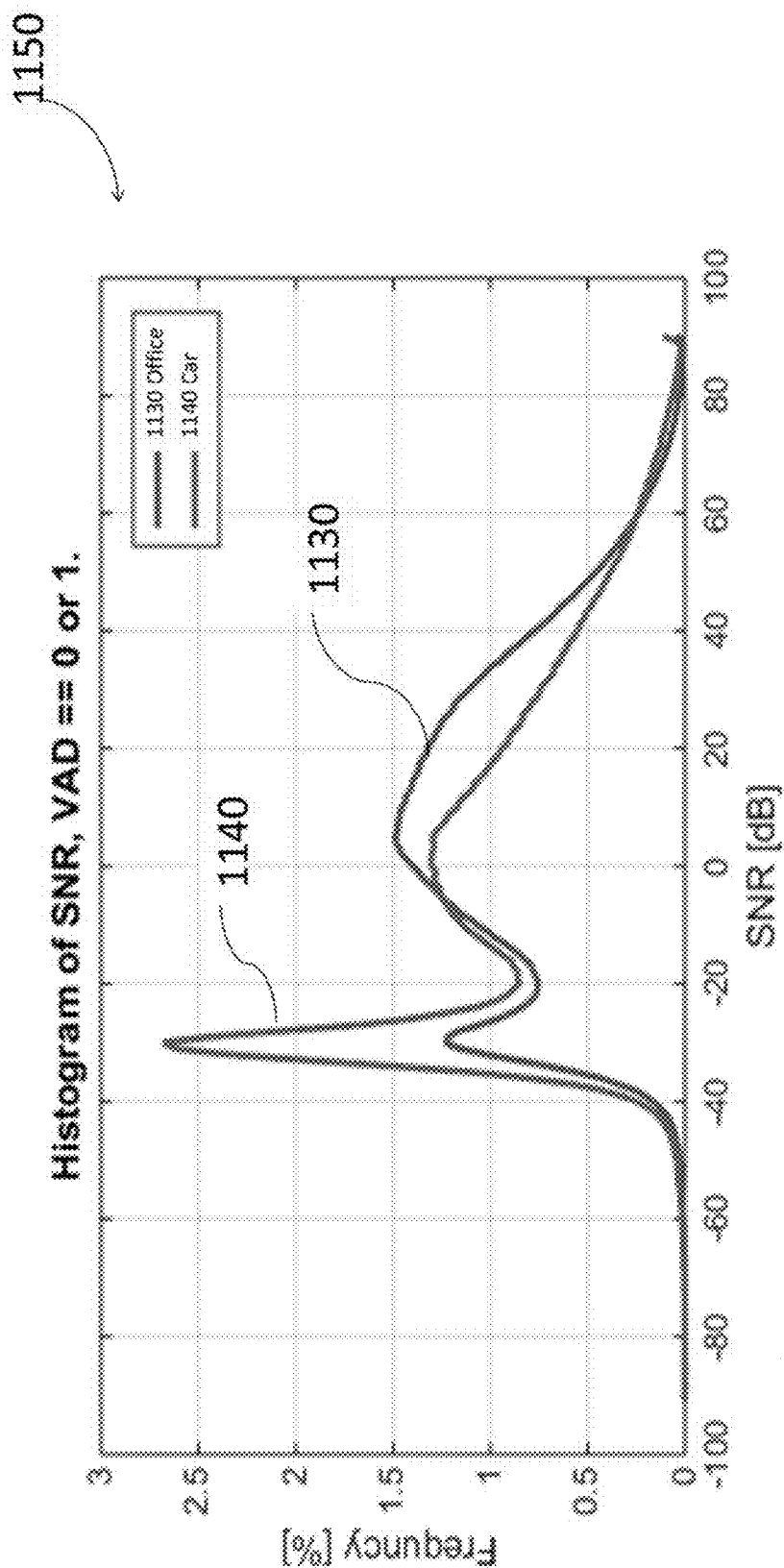

The office is relatively quiet environment, and the SNR evaluation is not so different between close talk and far talk, as can be seen in FIG. 11f.

Moreover, it seems that far talk has lower noise, which is surely untrue. This result might be explained due to the processing in the device which changes the noise levels. This result can be separated to the distribution of SNR values during active and non-active segments (see FIGS. 11g and 11h).

Histograms of SNR in a Car

In the case of a car, when the speaker on the other side was using a BT speaking system in the car. By comparing the distribution of the SNR values between car recordings 1140 and office recordings 1130 (see 1150 in FIG. 11i) the characteristics of such a case can be used. The difference in SNR distribution is very distinctive, and it can be used for classification.

In some embodiments of the disclosure, information about the person whose speech is being analyzed can be taken into account to enhance analysis of the audio signal to classify the audio output configuration, for example by knowing the person's gender, accent, language, age and the like.

Figure 12:
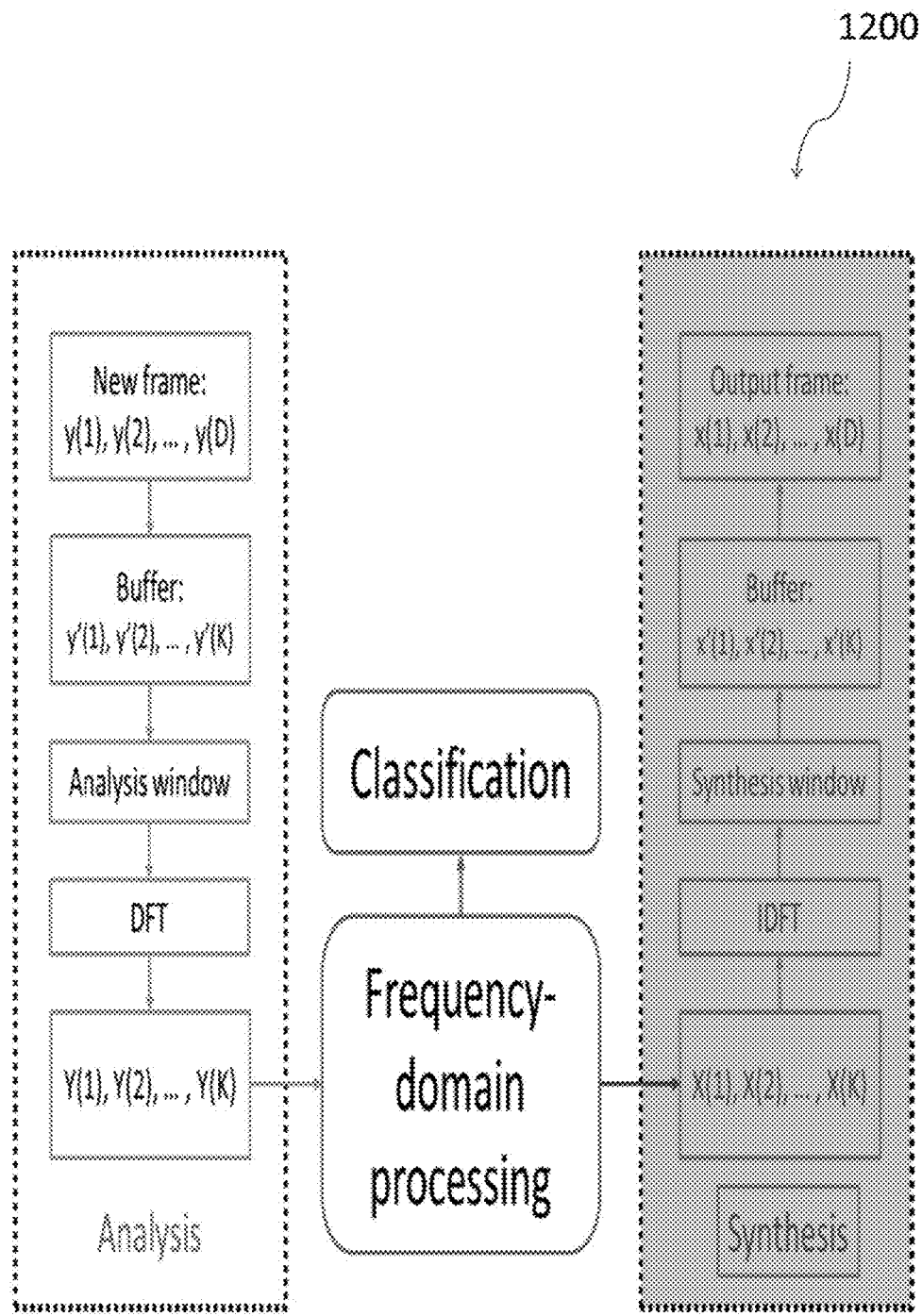
FIG. 12 is a schematic diagram of an algorithm for determining if an audio signal represents close talk or far talk in real time, according to an exemplary embodiment of the disclosure.

In an exemplary embodiment of the disclosure, the main structure of the algorithm 1200 for determining if an audio signal represents close talk or far talk in real time is perform as depicted in FIG. 12 showing the general structure of frequency domain processing. Likewise it should be noted that there exists a general trade-off between false alarm (FA) and miss detection (MD) when deciding if the audio signal is close talk or far talk.

In an exemplary embodiment of the disclosure, at every time frame, D new audio samples are streaming from the device, which are placed in a buffer of length K, where usually D≤K. Then, the buffer is multiplied by the analysis window and transformed to the DFT domain.

A few notes are in place:

The synthesis (ISTFT) block is colored gray, since the application will not necessarily produce an output signal.

This analysis-synthesis structure saves computation load in many cases (linear filtering for example) but with the cost of latency of K samples.

The increment size D is usually chosen such that the overlap between two sequential buffers is 50% or 75%, which result in smoother and more reliable results than 0% overlap. The higher degree of overlap, the more computation per time unit is required.

The exact size of D and K are determined to achieve the best performance in the lowest computation.

Figure 13:
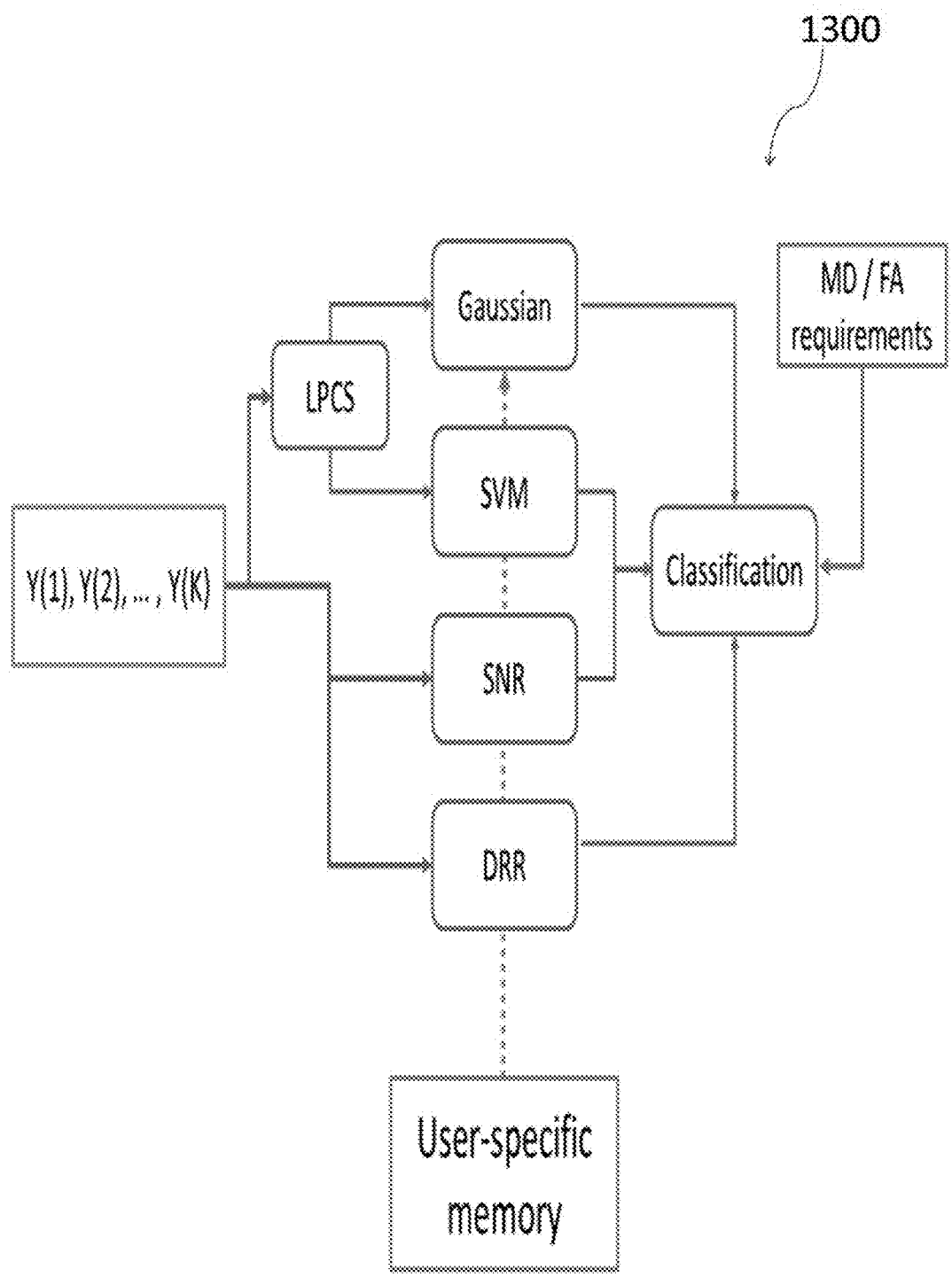
FIG. 13 is a schematic diagram of a general structure of a classification algorithm for processing the DFT domain samples from the analysis of FIG. 12, according to an exemplary embodiment of the disclosure.

In an exemplary embodiment of the disclosure, FIG. 13 demonstrates the general structure of the classification algorithm 1300, processing the DFT domain samples from the analysis part, The internal analysis blocks were discussed above—the Gaussian and SVM a posteriori analysis, and the SNR and DRR estimation. Here, we see that the algorithm integrates the information from these blocks and performs the classification decisions.

As a concluding step, we combine the information received from the different blocks by the following formula, $$p_c(t) = P\{H_c | y(-\infty), \ldots, y(t)\} = Pr\{H_c | G(t), SVM(t), SNR(t), DRR(t)\},$$

Where G(t), SVM(t), SNR(t), DRR(t) are the Gaussian, SVM, SNR, and DRR estimates as computed in the previous section. The values SVR(t), DRR(t) are defined, and G(t), SVM(t) are merely the estimated probability of hypothesis $H_c$ obtained by the Gaussian and the SVM classifier. To evaluate $Pr\{H_c | \ldots\}$, we use empirical analysis over the recorded database. Intuitively, $Pr\{H_c | \ldots\}$ gives a different weight for each of the features to obtain the best classifying result.

For every algorithm that is design to detect and raise an alarm against an event A, there is tradeoff between MD (an event A occurred without the alarm set) and FA (an event A did not occur, but the alarm was set off). A tradeoff always exists: to get MD=0 one can set the alarm always on (in this case, FA=1), and for FA=0, one can turn down the system and the alarm will never work (in this case, MD=1). A good system reduces both FA and MD, but when the optimal detection is obtained, one still can improve the cost function by a smart tradeoff between FA and MD.

This part of the algorithm is strongly connected to the user experience, but since undetected privacy breach can be very harmful, the choice is in the domain where FA>MD.

In some embodiments of the disclosure, additional enhancements may be used to improve the application, for example:

1. There is a challenge separating between the local and far speakers, since not all the devices allow for the recording of the local speaker separated from the far source. Optionally it is desirable to get the AMR coding data of the far speaker, which will save us the computation and time to do this speech analysis ourselves. However, if such data is unavailable, we can divide the recording to segments that contain (or not) the local speaker signal. The basis for separation is the [0, 300] Hz band, which is almost deleted by the AMR coder and therefore is built mainly by the local speaker.

2. In many cases, we use exponential time smoothing; e.g., assume we want $x_n$ to be a smoothed version of $\tilde{x}_n$, $$x_{n-1} = \alpha \cdot x_n + (1-\alpha) \cdot \tilde{x}_{n+1},$$

where $0 \leq \alpha \leq 1$ is a predefined smoothing factor. This method is very useful and effective, but can be accelerated if we are in start-up mode. In this case, we replace the constant $\alpha$ by the time-varying $\alpha_n$:

$$\alpha_n = \min\{1 - 1/n, \alpha_{max}\},$$

which has low values (i.e. fast convergence) in the beginning, growing monotonically, and stabilized at $1-1/n > \alpha_{max}$ to the value $\alpha_{max}$ to keep updating in steady pace. Before it is stabilized, the value of $x_n$ is exactly the empirical average, $$x_n = \frac{1}{n} \sum_{m=1}^{n} \tilde{x}_m.$$

A useful recursive formula for $\alpha_n$ is $$\alpha_{n+1} = 1 - \frac{1}{n+1} = \frac{n}{n+1} = \frac{1}{1+1/n} = \frac{1}{2-(1-1/n)} = \frac{1}{2-\alpha_n}.$$

However, this isn't enough. In several cases, it is desirable to update $x_n$ depending on another value; e.g., if $x_n$ is power estimation of speech, we would like to update it depending on the speech presence probability (SPP), so we don't add noise to the average. In this case, we'll use $\tilde{\alpha}_n$ instead, $$\alpha_n = \min\{1-1/n, \alpha_{max}\}$$

$$\beta_n = \zeta_n \cdot (1-\alpha_n)$$

$$\tilde{\alpha}_n = 1 - \beta_n = (1-\zeta_n) + \zeta_n \cdot \alpha_n,$$

where $0 \leq \zeta_n \leq 1$ is the said weighting function.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

It will be appreciated by persons skilled in the art that the present invention is not limited to what has been particularly shown and described hereinabove. Rather the scope of the present invention is defined only by the claims, which follow.

We claim:

1. A method of identifying a breach in privacy during a communication session, comprising:
    communicating with a remote communication device using a local communication device;
    analyzing an audio signal from the remote communication device to identify an audio input/output configuration of the remote communication device;
    determining from the audio output configuration if a breach in privacy is signified;
    receiving a message from the remote communication device indicating that a change has occurred in the audio input/output configuration of the remote configuration device;
    determining from the change if the audio input/output configuration of the remote communication device signifies a breach in privacy of the communication session;

wherein the determining from the audio input/output configuration is compared to the determining from the change to identify if the two are in agreement; and providing an indication if a breach in privacy is detected.

2. The method of claim 1, wherein the message is provided by an application that monitors the audio input/output configuration of the remote communication device.

3. The method of claim 1, wherein the message is delivered directly to the local communication device.

4. The method of claim 1, wherein the message is delivered to a server to deliver to the local communication device.

5. The method of claim 1, wherein the content of the received message is used to determine that a change has occurred in the audio input/output configuration of the remote communication device.

6. The method of claim 1, wherein the identity of a sender of the received message is used to determine that a change has occurred in the audio input/output configuration of the remote communication device.

7. The method of claim 1, wherein the audio input/output configuration indicates if the user of the remote communication device is speaking directly into the remote communication device or speaking at a distance from the remote communication device.

8. The method of claim 1, wherein the indication is provided in real time to the user of the local communication device if a breach in privacy is signified.

9. The method of claim 1, wherein if the determining from the audio input/output configuration compared to the determining from the change are not in agreement the determining from the audio/input configuration will take precedence.

10. The method of claim 1, wherein if the determining from the audio input/output configuration compared to the determining from the change are not in agreement the determining from the change will take precedence.

11. A system for identifying a breach in privacy during a communication session between a local communication device and a remote communication device, comprising:

an analysis application that is installable on the local communication device wherein the analysis application is programmed to analyze an audio signal from the remote communication device to identify an audio input/output configuration of the remote communication device and determine from the audio input/output configuration if a breach in privacy is signified;

wherein the analysis application is further configured to:
receive a message from the remote communication device indicating that a change has occurred in the audio input/output configuration of the remote configuration device;
determine from the change if the audio input/output configuration of the remote communication device signifies a breach in privacy of the communication session;
wherein the determining from the audio input/output configuration is compared to the determining from the change to identify if the two are in agreement; and an indication is provided if a breach in privacy is detected.

12. The system of claim 11, wherein the analysis application is further configured to be installed also on the remote communication device, monitor the audio input/output configuration of the remote communication device and provide the message to the analysis application on the local communication device.

13. The system of claim 11, wherein the message is delivered directly to the local communication device.

14. The system of claim 11, wherein the message is delivered to a server to deliver to the local communication device.

15. The system of claim 11, wherein the content of the received message is used to determine that a change has occurred in the audio input/output configuration of the remote communication device.

16. The system of claim 11, wherein the identity of a sender of the received message is used to determine that a change has occurred in the audio input/output configuration of the remote communication device.

17. The system of claim 11, wherein the audio input/output configuration indicates if the user of the remote communication device is speaking directly into the remote communication device or speaking at a distance from the remote communication device.

18. The system of claim 11, wherein the indication is provided in real time to the user of the local communication device if a breach in privacy is signified.

19. The system of claim 11, wherein if the determining from the audio input/output configuration compared to the determining from the change are not in agreement the determining from the audio/input configuration will take precedence.

20. The system of claim 11, wherein if the determining from the audio input/output configuration compared to the determining from the change are not in agreement the determining from the change will take precedence.

* * * * *